United States Patent
Abbott et al.

(10) Patent No.: US 7,323,497 B2
(45) Date of Patent: Jan. 29, 2008

(54) PRODUCTION OF HYDROCARBONS BY STEAM REFORMING AND FISCHER-TROPSCH REACTION

(75) Inventors: Peter Edward James Abbott, Cleveland (GB); Mark McKenna, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 10/555,369

(22) PCT Filed: Apr. 21, 2004

(86) PCT No.: PCT/GB2004/001677

§ 371 (c)(1),
(2), (4) Date: Jul. 20, 2006

(87) PCT Pub. No.: WO2004/096952

PCT Pub. Date: Nov. 11, 2004

(65) Prior Publication Data

US 2007/0010590 A1    Jan. 11, 2007

(30) Foreign Application Priority Data

May 2, 2003    (GB) .................. 0310106.0

(51) Int. Cl.
*C07C 27/00* (2006.01)
(52) U.S. Cl. ............. 518/700; 518/702; 518/703; 518/704; 518/705
(58) Field of Classification Search ......... 518/700–705
See application file for complete search history.

(56) References Cited

U.S. PATENT DOCUMENTS

| | | | |
|---|---|---|---|
| 4,690,690 A | 9/1987 | Andrew et al. | |
| 4,695,442 A | 9/1987 | Pinto et al. | |
| 4,910,228 A | 3/1990 | Lywood | |
| 4,999,133 A * | 3/1991 | Banquy | 252/373 |
| 2002/0006968 A1 * | 1/2002 | Abbott | 518/704 |

FOREIGN PATENT DOCUMENTS

| | | |
|---|---|---|
| GB | 1 578 270 | 11/1980 |
| WO | WO-97/05947 | 2/1997 |
| WO | WO-00/09441 | 2/2000 |
| WO | WO-00/58242 | 10/2000 |
| WO | WO-03/016250 A1 | 2/2003 |

* cited by examiner

*Primary Examiner*—J. Parsa
(74) *Attorney, Agent, or Firm*—RatnerPrestia

(57) ABSTRACT

A process for the production of hydrocarbons is described including; a) subjecting a mixture of a hydrocarbon feedstock and steam to catalytic steam reforming to form a partially reformed gas, b) subjecting the partially reformed gas to partial combustion with an oxygen-containing gas and bringing the resultant partially combusted gas towards equilibrium over a steam reforming catalyst to form a reformed gas mixture, c) cooling the reformed gas mixture to below the dew point of the steam therein to condense water and separating condensed water to give a de-watered synthesis gas, d) synthesising hydrocarbons from side de-watered synthesis gas by the Fischer-Tropsch reaction and e) separating the hydrocarbons from co-produced water, characterised in that at least part of said co-produced water is fed to a saturator wherein it is contacted with hydrocarbon feedstock to provide at least part of the mixture of hydrocarbon feedstock and steam subjected to steam reforming.

10 Claims, 3 Drawing Sheets

PRODUCTION OF HYDROCARBONS BY STEAM REFORMING AND FISCHER-TROPSCH REACTION

This application is the U.S. National Phase application of PCT International Application No. PCT/GB2004/001677, filed Apr. 21, 2004, and claims priority of British Patent Application No. 0310106.0, filed May 2, 2003.

FIELD OF THE INVENTION

This invention relates to the production of hydrocarbons by the Fischer-Tropsch process and to the production of synthesis gas there-for. The synthesis gas contains hydrogen and carbon oxides and is produced by the catalytic steam reforming and partial oxidation of a hydrocarbon feedstock.

BACKGROUND OF THE INVENTION

Steam reforming and partial oxidation are widely practised and are used to produce hydrogen streams and synthesis gas for a number of processes such as ammonia, methanol production as well as the Fischer-Tropsch process. In a steam reforming process, a desulphurised hydrocarbon feedstock, e.g. methane, natural gas or naphtha, is mixed with steam and passed at elevated temperature and pressure over a suitable catalyst, generally a transition metal, especially nickel, on a suitable support. Steam is often provided by means of a saturator where water is contacted with the pre-heated hydrocarbon feedstock. For applications such as Fischer-Tropsch synthesis, it is desired that the molar ratio of hydrogen to carbon monoxide in the resulting synthesis gas is about 2 and the amount of carbon dioxide present is small.

Hence, in order to obtain a synthesis gas more suited to Fischer-Tropsch synthesis, the steam reformed gas may be subjected to partial combustion using a suitable oxidant, e.g. air or oxygen. This increases the temperature of the partially reformed gas, which is preferably then passed adiabatically through a bed of a steam reforming catalyst, again usually nickel on a suitable support, to bring the gas composition towards equilibrium.

The initial steam reforming stage may be carried out in one or more stages of adiabatic low temperature steam reforming, where the hydrocarbon/steam mixture is passed adiabatically through a bed of steam reforming catalyst in a process known as pre-reforming, or the steam/hydrocarbon mixture may be passed through externally-heated tubes containing a steam reforming catalyst in a heat exchange reformer in a process known as primary reforming. If necessary, the pre-reformed gas stream may be subjected subsequently to primary reforming. Where the feed gas to the partial combustion stage is a hydrocarbon/steam mixture or a pre-reformed feed gas, the subsequent partial combustion/steam reforming process is known as autothermal reforming and where the feed gas is a primary reformed gas, the subsequent process is known as secondary reforming. The principal differences between the autothermal and secondary reforming processes are the composition, e.g. the hydrogen content, and temperature of the partially reformed gas fed to the partial combustion step. Typically a pre-reformed gas fed to an autothermal reformer will contain less than 10%, no more than 20% by volume hydrogen and be at a temperature less than 650° C. whereas a primary reformed gas fed to a secondary reformer will contain greater than 10% hydrogen by volume and be at a temperature greater than 650° C. Autothermal or secondary reforming serve three purposes: the increased temperature resulting from the partial combustion and subsequent adiabatic steam reforming results in a greater amount of reforming so that the reformed gas contains a decreased proportion of residual hydrocarbon (methane). Secondly the increased temperature favours the reverse shift reaction so that the carbon monoxide to carbon dioxide ratio is increased. Thirdly the partial combustion effectively consumes some of the hydrogen present in the steam-reformed gas, thus decreasing the hydrogen to carbon oxides ratio. In combination, these factors render the autothermal/secondary reformed gas formed from natural gas as a feedstock more suited for use as synthesis gas for applications such as Fischer-Tropsch synthesis than if the autothermal/secondary reforming step was omitted. Also more high-grade heat can be recovered from the autothermal/secondary reformed gas: in particular, the recovered heat can be used to heat the catalyst-containing tubes of the primary reformer. Thus the primary reforming may be effected in a heat exchange reformer in which the catalyst-containing reformer tubes are heated by the secondary reformed gas. Examples of such reformers and processes utilising the same are disclosed in for example U.S. Pat. No. 4,690,690 and U.S. Pat. No. 4,695,442.

Fischer-Tropsch processes produce hydrocarbons from the synthesis gas stream. Water is a co-product in the reaction, which may be described as follows;

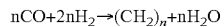

$$nCO + 2nH_2 \rightarrow (CH_2)_n + nH_2O$$

We have found that the efficiency of such hydrocarbon synthesis processes may be improved by utilising at least a portion of the co-produced water from the Fischer-Tropsch process in a saturator to provide steam for the steam reforming process. Moreover, the co-produced water from a Fischer-Tropsch process can contain significant quantities of oxygenated hydrocarbons such as alcohols, aldehydes, ketones and carboxylic acids. These give rise to a need for subsequent waste-water treatment. By returning Fischer-Tropsch co-produced water to the reforming process, the present invention advantageously returns the oxygenates to the reforming process as a source of hydrogen and carbon oxides and also reduces the need for waste-water treatment.

SUMMARY OF THE INVENTION

Accordingly the present invention provides a process for the production of hydrocarbons comprising;
a) subjecting a mixture of a hydrocarbon feedstock and steam to catalytic steam reforming to form a partially reformed gas,
b) subjecting the partially reformed gas to partial combustion with an oxygen-containing gas and bringing the resultant partially combusted gas towards equilibrium over a steam reforming catalyst to form a reformed gas mixture,
c) cooling the reformed gas mixture to below the dew point of the steam therein to condense water and separating condensed water to give a de-watered synthesis gas,
d) synthesising hydrocarbons from said de-watered synthesis gas by the Fischer-Tropsch reaction and
e) separating the hydrocarbons from co-produced water, characterised in that at least part of said co-produced water is fed to a saturator wherein it is contacted with the hydrocarbon feedstock to provide at least part of the mixture of hydrocarbon feedstock and steam subjected to catalytic steam reforming.

BRIEF DESCRIPTION OF THE DRAWINGS

The invention is illustrated by reference to the accompanying drawings in which.

DETAILED DESCRIPTION OF THE INVENTION

Figure 1:
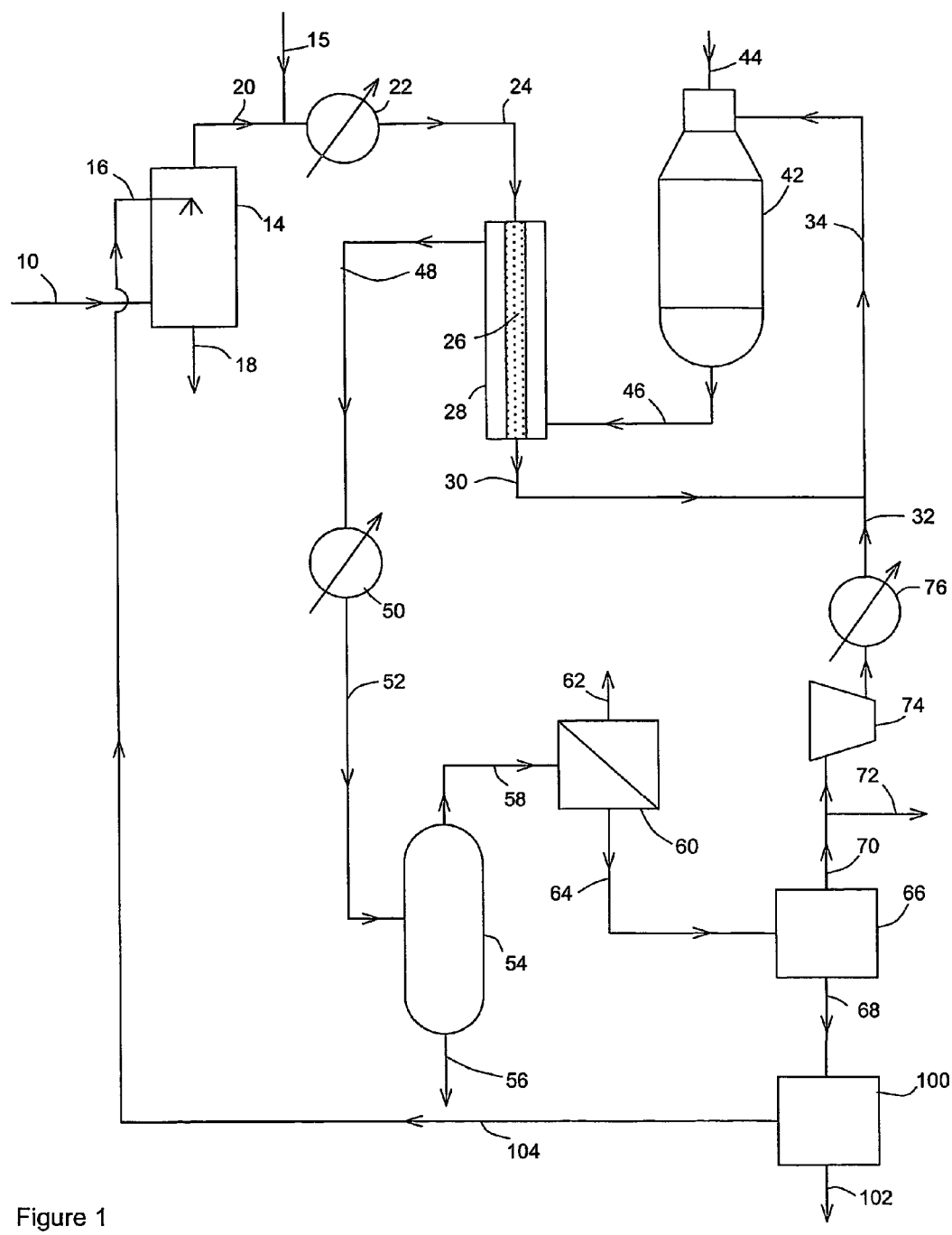
FIG. 1 is a diagrammatic flowsheet of one embodiment of the invention utilising a primary and secondary reformer wherein Fischer-Tropsch tail gas is added to the primary reforming gas.

In one embodiment of the present invention, the reforming process to generate the reformed gas mixture comprises subjecting a hydrocarbon feedstock/steam mixture to at least one stage (preferably one or two) stages of adiabatic steam reforming, also known as pre-reforming, and then passing the pre-reformed gas fed to an autothermal reformer where it is partially combusted with an oxygen-containing gas and the partially combusted gas passed through a bed of steam reforming catalyst.

In another embodiment of the present invention, the steam reforming is effected using a heat exchange reformer and the process to generate the reformed gas mixture comprises subjecting a mixture of a hydrocarbon feedstock and steam to steam reforming by passing the mixture over a catalyst disposed in externally-heated tubes in a heat exchange reformer to form a primary reformed gas, subjecting the primary reformed gas to secondary reforming by partially combusting the primary reformed gas with an oxygen-containing gas and bringing the resultant partially combusted gas towards equilibrium over a secondary reforming catalyst to form the reformed gas mixture. The heat exchange medium for externally heating the tubes of the heat exchange reformer may be a combusting hydrocarbon fuel, a flue gas or a primary reformed gas that has been subjected to secondary reforming. Preferably the heat exchange medium is the secondary reformed gas mixture, which is used to heat the tubes of the heat exchange reformer, thereby producing a partially cooled reformed gas mixture. In one type of heat exchange reformer, the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Heat exchange reformers of this type are described in GB 1 578 270 and WO 97/05 947.

Another type of heat exchange reformer that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated by the secondary reformed gas. The mixture of hydrocarbon feedstock, carbon dioxide and steam is fed to the end of the outer tubes remote from said closed end so that the mixture passes through said annular space and undergoes steam reforming and then passes through the inner tube. As in the double-tube reformer of U.S. Pat. No. 4,910,228, in the present invention preferably insulation is provided on the walls of the inner tube.

In the process of the invention the feedstock may be any gaseous or low boiling hydrocarbon feedstock such as natural gas or naphtha. It is preferably methane or natural gas containing a substantial proportion, e.g. over 90% v/v methane. If the feedstock contains sulphur compounds, before, or preferably after, compression the feedstock is subjected to desulphurisation, e.g. hydrodesulphurisation and absorption of hydrogen sulphide using a suitable absorbent, e.g. a zinc oxide bed. The feedstock is typically compressed to a pressure in the range 10-100 bar abs, preferably 20-60 bar abs.

The hydrocarbon may be preheated to a suitable temperature and contacted with water, which is often heated, to generate a steam-hydrocarbon mixture. Steam introduction is effected by saturation of the feedstock by contact of the latter with a stream of heated water in a saturator. The water used to generate the steam hydrocarbon mixture is at least part of the co-produced water from a Fischer-Tropsch hydrocarbon synthesis reaction fed by the synthesis gas generated by the reforming process. Preferably all the co-produced water from the hydrocarbon synthesis process is fed to the saturator where the oxygenated hydrocarbons present will often boil as low boiling azeotropes with water, thereby depleting the remaining water of oxygenates. The water that is not boiled to produce steam is thereby reduced in oxygenated hydrocarbons compared to the co-produced water from the Fischer-Tropsch process. Accordingly the requirement for waste-water-treatment of such water is reduced.

The amount of steam generated is preferably such as to give a steam ratio of 0.5 to 2, typically 1 to 2, i.e. 1 to 2 moles of steam per gram atom of hydrocarbon carbon in the feedstock. The amount of steam is preferably minimised as this leads to a lower cost, more efficient process. It is preferred that the steam ratio is below 1.5, more preferably 0.5-1.0.

Following saturation, the hydrocarbon feedstock/steam mixture is subjected to a step of steam reforming which may be one or more (preferably one or two) stages of pre-reforming and/or primary steam reforming, to form a partially reformed gas. Preferably the steam reforming stage comprises primary steam reforming in a heat exchange reformer. Before it is fed to the heat exchange reformer, the feedstock/steam mixture may be subjected to a step of adiabatic low temperature reforming. In such a process, the hydrocarbon/steam mixture is heated, typically to a temperature in the range 350-650° C., preferably 400-650° C., and then passed adiabatically through a bed of a suitable catalyst, usually a supported nickel catalyst having a high nickel content, for example above 40% by weight. During such an adiabatic low temperature reforming step any hydrocarbons higher than methane react with steam to give a mixture of methane, carbon oxides and hydrogen. The use of such an adiabatic reforming step, commonly termed pre-reforming, is desirable to ensure that the feed to the heat exchange reformer contains no hydrocarbons higher than methane and also contains a significant amount of hydrogen. This is desirable in order to minimise the risk of carbon formation on the catalyst in the heat-exchange reformer.

After any such pre-reforming step, the mixture is further heated, if necessary, to the heat exchange reformer inlet temperature, which is typically in the range 300-500° C. The mixture is then passed through the catalyst filled tubes of the heat exchange reformer. During passage through the reforming catalyst, the endothermic reforming reaction takes place with the heat required for the reaction being supplied by a combusted fuel gas or preferably from the secondary reformed gas flowing past the exterior surface of the outer tubes. The primary reforming catalyst may be nickel supported on a refractory support such as rings or pellets of calcium aluminate cement, alumina, titania, zirconia and the like. Alternatively a combination of a nickel and precious metal catalyst may be used. For example, a portion of the nickel catalyst may be replaced with a precious metal catalyst, such as a ruthenium-based catalyst.

The temperature of the resulting partially reformed gas is preferably in the range 650-850° C.

The partially reformed gas is then subjected to a step of partial combustion. The partially reformed gas fed to the partial combustion vessel may preferably additionally comprise a tail gas from the Fischer-Tropsch synthesis and/or, carbon dioxide recovered from the synthesis gas. Where primary and secondary reforming are used to produce the reformed gas stream it may also be desirable, in order to reduce the reforming duty on the primary reformer, to bypass a portion of the hydrocarbon (or hydrocarbon/steam mixture) around the primary reformer and feed it directly to the secondary reformer. In forming the feed stream for the partial combustion stage, the Fischer-Tropsch tail gas, and/ or carbon dioxide and/or second hydrocarbon stream, may be combined separately in any order to the partially reformed gas or may be pre-mixed if desired before being fed to the partially reformed gas. However, if a tail gas and hydrocarbon bypass are combined with the partially reformed gas, pre-mixing the tail gas and second hydrocarbon stream has the advantage that, if necessary, they may be heated together in one rather than two heat exchangers. Howsoever the second hydrocarbon stream and the Fischer-Tropsch tail gas may be added it is preferable, to avoid decomposition of the hydrocarbons therein, that they are not heated to temperatures in excess of 420° C. prior to combination with the partially reformed gas. As an alternative to adding the Fischer-Tropsch tail gas to the partially reformed gas, under low steam ratio conditions it may be desirable where the tail gas contains hydrocarbons other than methane, to feed the tail gas to the hydrocarbon-steam mixture in order to avoid carbon deposition in the secondary/autothermal reformer.

The combustion stage feed stream comprising the partially reformed gas is then subjected to partial combustion with a gas containing free oxygen supplied via burner apparatus. Whereas some steam may be added to the oxygen containing gas, preferably the amount is minimised so that a low overall steam ratio for the reforming process is achieved. The gas containing free oxygen is preferably substantially pure oxygen, e.g. oxygen containing less than 5% nitrogen. However where the presence of substantial amounts of inerts is permissible, the gas containing free oxygen may be air or enriched air. Where the gas containing free oxygen is substantially pure oxygen, for metallurgical reasons it is preferably fed to the secondary reformer at a temperature below about 250° C.

The amount of oxygen fed to the partial combustion stage may be varied to effect the composition of the reformed gas mixture. Where the partial combustion stage is part of a secondary reforming process and the resulting reformed gas mixture is used to heat the tubes of a heat exchange reformer, the amount of oxygen fed to the partial combustion stage may also be used to control the heat balance of the heat exchange reformer. In general, increasing the amount of oxygen, thereby increasing the temperature of the reformed gas leaving the secondary reformer, causes the $[H_2]/[CO]$ ratio to decrease and the proportion of carbon dioxide to decrease. Alternatively, if the conditions are arranged such that the product composition and temperature is kept constant, increasing the temperature at which the feedstock is fed to the heat exchange reformer decreases the amount of oxygen required (at a constant oxygen feed temperature). Decreasing the required amount of oxygen is advantageous as this means that a smaller, and hence cheaper, air separation plant can be employed to produce the oxygen. The temperature of the feedstock can be increased by any suitable heat source, which may, if necessary, be a fired heater, which of course can use air, rather than oxygen, for the combustion. The amount of oxygen-containing gas added is preferably such that 40 to 70, preferably 40 to 60 moles of oxygen are added per 100 gram atoms of carbon In the hydrocarbon feedstock. The partial combustion reactions may raise the gas temperature of the gas mixture to between 1000 and 1700° C., often to between 1000 and 1500° C.

The hot partially combusted gas then passes though a bed of steam reforming catalyst to form the reformed gas mixture. The steam reforming catalyst is usually nickel supported on a refractory support such as rings or pellets of calcium aluminate cement, alumina, titania, zirconia and the like. The partially combusted gas is cooled as it passed through the bed of steam reforming catalyst. As stated above, the temperature of the reformed gas may be controlled by the amount of oxygen added for the partial combustion step. Preferably the amount of oxygen added is such that the reformed gas mixture leaves the steam reforming catalyst is at a temperature in the range 800-1050° C.

As stated above, the reformed gas mixture may then be used to provide the heat required for a primary reforming step by using the secondary reformed gas as the hot gas flowing past the tubes of the heat exchange reformer. During this heat exchange, the reformed gas mixture is cooled by transferring heat to the gas undergoing primary reforming. Preferably the secondary reformed gas cools by several hundred degrees centigrade but of course it will leave the heat exchange reformer at a temperature somewhat above the temperature at which the hydrocarbon feedstock/steam mixture is fed to the heat exchange reformer. Preferably the cooled reformed gas mixture leaves the heat exchange reformer at a temperature in the range 500-650° C.

In order to remove water from the reformed gas mixture, it is subsequently cooled to below the dew point of steam at which water condenses using one or more heat exchangers. Such cooling may be effected using a stream of cold water and/or by indirect heat exchange. The water condensate is separated from the cooled reformed gas mixture using for example, a separator. Heat recovered during this cooling may be employed for reactants pre-heating and/or for heating water used to provide the steam employed in the steam reforming step. As described hereinafter, the recovered heat may additionally, or alternatively, be used in a carbon dioxide separation step.

Whereas at least a portion of the steam for the reforming process is provided by feeding at least a portion of the co-produced Fischer-Tropsch water to a saturator, during start-up or shutdown procedures, or during significant process excursions, the steam may additionally be provided by boiling water from other sources. One particularly suitable source is the condensate separated from the cooled reformed gas mixture. The steam may be provided by feeding process condensate to the saturator or by adding steam to the steam/hydrocarbon mixture.

Typically the de-watered synthesis gas contains 5 to 15% by volume of carbon dioxide (on a dry basis). In one embodiment of the invention, after separation of the condensed water, carbon dioxide may be separated from the de-watered synthesis gas prior to the Fischer-Tropsch synthesis stage and recycled to the synthesis gas production. Such recycle of carbon dioxide is preferred as it provides a means to control $[H_2]/[CO]$ ratio to achieve the optimal figure for FT synthesis of about 2. Preferably the amount of recycled carbon dioxide is maximised up to the quantity which is needed to achieve this ratio. Typically this may be at least 75%, particularly at least 90%, of the carbon dioxide in the de-watered synthesis gas. The recycled carbon dioxide stream may be added to the hydrocarbon feedstock but is preferably added to the partially reformed gas mixture prior to the partial combustion thereof. Where the recycled carbon dioxide (either as carbon dioxide separated from the synthesis gas prior to hydrocarbon synthesis, or as the recycled Fischer-Tropsch tail gas) is added to the partially reformed gas, rather than to the hydrocarbon feedstock prior to steam reforming, there is an advantage in that the steam reforming process can be operated at a lower steam ratio.

The carbon dioxide may be separated by a conventional "wet" process or alternatively a pressure swing adsorption process may be employed. In a conventional "wet" process the secondary reformed gas is de-watered and is then contacted with a stream of a suitable absorbent liquid, such as an amine, particularly methyl diethanolamine (MDEA) solution so that the carbon dioxide is absorbed by the liquid to give a laden absorbent liquid and a gas stream having a decreased content of carbon dioxide. The laden absorbent liquid is then regenerated, for example by heating, to desorb the carbon dioxide and to give a regenerated absorbent liquid, which is then recycled to the carbon dioxide absorption stage.

Alternatively, or in addition to a stage of carbon dioxide separation and recycle, before the de-watered synthesis gas is passed to the Fischer-Tropsch hydrocarbon synthesis stage it may be subjected to a step of hydrogen separation, e.g. through a membrane, in order to provide pure hydrogen for other uses e.g. hydrocracking or hydrodesulphurisation of the hydrocarbon feedstock. In this situation, the tail gas recycle, if employed (in the absence of carbon dioxide separation and recycle) or the carbon dioxide recycle stream, if employed, are controlled to give a $[H_2]/[CO]$ ratio, which is higher that the optimum for Fischer-Tropsch synthesis, so that after the required amount of hydrogen is separated the resulting synthesis gas has an $[H_2]/[CO]$ ratio of about 2.

In the Fischer-Tropsch process, a synthesis gas containing carbon monoxide and hydrogen is reacted in the presence of a catalyst, which is typically a cobalt- and/or iron-containing composition. The process may be effected using one or more fixed catalyst beds or using a moving catalyst, for example a slurry of the catalyst in a hydrocarbon liquid, e.g. in one or more slurry bubble column reactors. The synthesised hydrocarbon liquid and co-produced water are separated from the residual gas. If co-produced water is generated in more than one reactor or bed the water may be recovered after each reactor or bed and combined to form the co-produced water sent to the saturator. The reaction may be carried out in a single pass or part of the residual gas may be combined with fresh synthesis gas and recycled to the Fischer-Tropsch reactor. Any residual gas which is not recycled to the Fischer-Tropsch reactor for further reaction is herein termed tail gas. Since the reaction of the synthesis gas is incomplete, the tail gas will contain some hydrogen and carbon monoxide. In addition, the tail gas may also contain some light hydrocarbons, e.g. paraffins including methane, ethane, butane, olefins such as propylene, alcohols such as ethanol, and traces of other minor components such as organic acids. It will generally also contain some carbon dioxide, which may be present in the synthesis gas fed to the Fischer-Tropsch reaction and/or is formed by side reactions. Possibly, as a result of incomplete separation of the synthesised hydrocarbon product, the tail gas may also contain a small proportion of higher hydrocarbons, i.e. hydrocarbons containing 5 or more carbon atoms. These components of the tail gas represent a valuable source of carbon and hydrogen. The tail gas may therefore desirably be recycled to the reforming process by feeding it to the hydrocarbon/steam mixture or the partially reformed gas. In one preferred embodiment, a portion of the tail gas is added to the primary reformed gas before partial combustion thereof, i.e. addition of tail gas to the partially reformed gas mixture before partial combustion thereof. To avoid the undesirable build up of inerts, it is desirable only to utilize tail gas recycle when the partial combustion step is performed using substantially pure oxygen. The amount of tail gas that may be recycled is preferably between 5 and 100% by volume of the tail gas produced in the Fischer-Tropsch synthesis stage.

The synthesised hydrocarbon product is separated from the co-produced water. This may be achieved using one or more separators and techniques known to those skilled in the art. The co-produced water often contains oxygenated hydrocarbon by-products such as alcohols, aldehydes, ketones and carboxylic acids. In the present invention at least a portion of the co-produced water is fed to the saturator where it contacts the hydrocarbon feedstock to form at least part of the hydrocarbon/steam mixture feed to the steam reforming stage of the synthesis gas generation process. Preferably >50%, more preferably >75%, most preferably >90%, especially >99% by weight of the co-produced water is fed to the saturator. Preferably, prior to being fed to the saturator, the co-produced water is pre-treated to reduce fouling or corrosion in the saturator and water heating exchangers, e.g. by passing the water through filters and/or adjusting its pH. The co-produced water fed to the saturator that is not converted to steam is depleted in oxygenated hydrocarbons and may be recovered and sent for secondary waste-water treatment.

In one embodiment employing primary and secondary reforming stages, the hydrocarbon feedstock with or without steam may be divided Into first and second streams and added separately to the steam reforming and partial oxidation stages of the synthesis gas generation process. Hence if desired the second hydrocarbon stream may bypass the steam reforming step and be added to the primary reformed gas mixture prior to combustion thereof. Where this is done, the second hydrocarbon stream comprises between 5 and 50% by volume, preferably between 5 and 40% by volume and most preferably between 5 and 30% by volume of the hydrocarbon feedstock. Amounts less than 5% by volume provide too small a benefit whereas amounts greater than 50% are less economically attractive due to a consequential increase in size and cost of the steam reformer or increased requirement for oxygen in the partial combustion step. By bypassing a proportion of the hydrocarbon feedstock to the primary reformed gas, it may be possible to operate the process at lower overall steam ratio without the risk of carbon deposition on the reforming catalyst in the primary reformer.

In FIG. 1, preheated hydrocarbon feedstock, for example a desulphurised natural gas containing over 90% v/v methane is fed via line 10 to a saturator 14 where it is contacted with hot water provided by line 16. Waste hot water is recovered via line 18 and may be recycled if desired. The resulting mixture of hydrocarbon and steam is fed, typically at a pressure in the range 10 to 60 bar abs., via line 20 to a heat exchanger 22 and thence, via line 24, to the catalyst-containing tubes 26 of a heat exchange reformer 28. If desired, make-up steam may be added to the hydrocarbon steam mixture, e.g. via line 15 before heat exchanger 22. The mixture is typically heated to a temperature in the range 300 to 500° C. prior to entry into the tubes 26. For simplicity only one tube is shown in the drawing: in practice there may be several tens or hundreds of such tubes. The feedstock/steam mixture undergoes primary steam reforming in the tubes 26 and the primary reformed gas leaves the heat exchange reformer 28 via line 30, typically at a temperature in the range 650 to 850° C. The primary reformed gas in line 30 is mixed with Fischer-Tropsch tail gas (to be described) fed via line 32. The resulting primary reformed gas/tail gas mixture then proceeds via line 34 to a secondary reformer 42, to which oxygen is supplied via line 44.

The secondary reformer feed stream is partially combusted in the secondary reformer and brought towards equilibrium by passage over a bed of secondary reforming catalyst. The secondary reformed gas leaves secondary reformer via line 46, typically at a temperature in the range 900 to 1050° C.

Heat is recovered from the hot secondary reformed gas by passing the secondary reformed gas via line 46 to the shell side of the heat exchange reformer 28 so that the secondary reformed gas forms the heating medium of the heat exchange reformer. The secondary reformed gas is thus cooled by heat exchange with the gas undergoing reforming in the tubes 26 and leaves the heat exchange reformer via line 48, typically at a temperature 50 to 200° C. above the temperature at which the first hydrocarbon stream/steam mixture is fed to the tubes 26. The partially cooled secondary reformed gas is then cooled further with heat recovery in one or more heat exchangers 50 to a temperature below the dew point of the water in the secondary reformed gas. The cooled secondary reformed gas is then fed via line 52 to a separator 54 wherein condensed water is separated as a liquid water stream 56. This water may be recycled by heating it in a heat exchanger (not shown) and feeding it to line 16 for use in the saturator 14.

The resulting de-watered gas is then fed, via line 58, to an optional hydrogen separation unit 60, e.g. a membrane unit or a pressure swing adsorption stage, to separate part of the hydrogen in the de-watered gas as a hydrogen stream 62. The resultant synthesis gas is then fed via line 64 to a Fischer-Tropsch synthesis stage 66, wherein liquid hydrocarbons are synthesised and are separated, together with co-produced water, as a product stream 68 leaving a tail gas stream 70. Part of the tail gas is purged as stream 72 to avoid a build up of inerts, e.g. nitrogen which may be present in the hydrocarbon feedstock as a contaminant and/or is often present in small amounts as an impurity in the oxygen used for the partial combustion. The purged tail gas may be used as fuel, for example in a fired heater heating the mixture of first hydrocarbon stream and steam fed to the heat exchange reformer. The remainder of the tail gas is fed to a compressor 74 and then to a heat exchanger 76 and then fed via line 32 to be mixed with the primary reformed gas. The product stream 68 is fed to a separator 100 where co-produced water is separated from the synthesised liquid hydrocarbons 102. The co-produced water is fed via line 104 from separator 100 to the saturator 14 where it contacts hydrocarbon to form at least part of the hydrocarbon steam mixture fed to the reformer 28.

Figure 2:
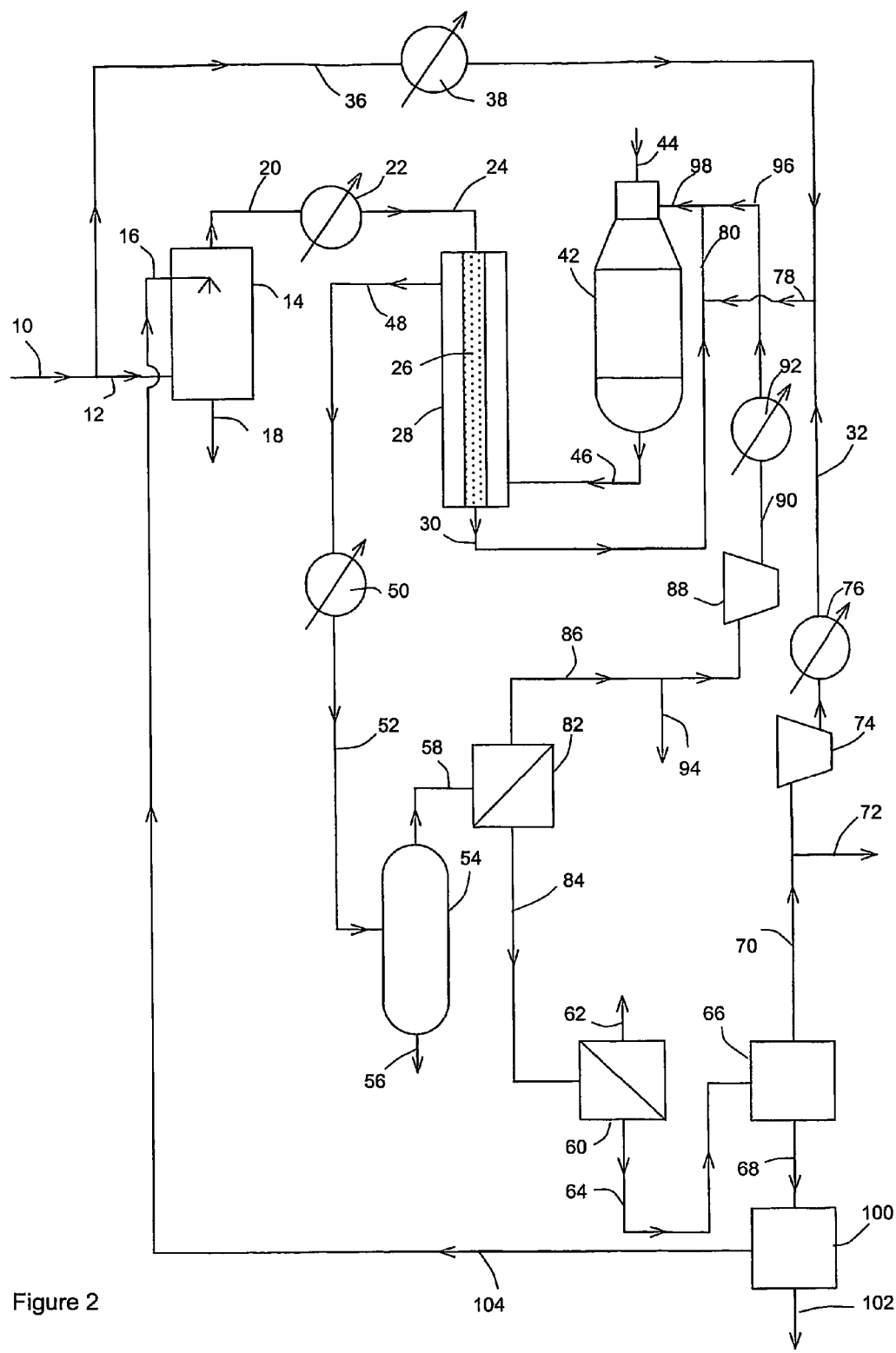
FIG. 2 is a diagrammatic flowsheet of a second embodiment of the invention utilising a primary and secondary reformer wherein, in addition to Fischer-Tropsch tail gas, hydrocarbon feedstock and carbon dioxide separated from the secondary reformed gas are added to the primary reformed gas.

In FIG. 2, the hydrocarbon feedstock fed via line 10 is divided into two streams. The first stream is fed via line a 12 to the saturator 14 and the second hydrocarbon stream by-passes the primary reforming stage via line 36 and heat exchanger 38 and is mixed with the Fischer-Tropsch tail gas fed via line 32 and the resulting mixture fed via line 78 to the primary reformed gas 30 to form a primary reformed gas mixture 80.

The de-watered synthesis gas is fed via line 58 to a carbon dioxide separation stage 82 wherein carbon dioxide is separated from the de-watered synthesis gas. The resulting de-watered, carbon dioxide-depleted synthesis gas is fed via line 84 to the optional hydrogen separation unit 60 and thence to the Fischer-Tropsch synthesis stage 66. The separated carbon dioxide from separation stage 82 is fed via line 86 to a compressor 88 and then via line 90 to a heat exchanger 92. To further improve control of the gas composition, separated carbon dioxide may be purged from the process prior to compression and heating via line 94. The heated, compressed carbon dioxide stream is fed via line 96 to the primary reformed gas mixture 80 and the resulting secondary reformer feed stream passed to the secondary reformer 42 via line 98.

Figure 3:
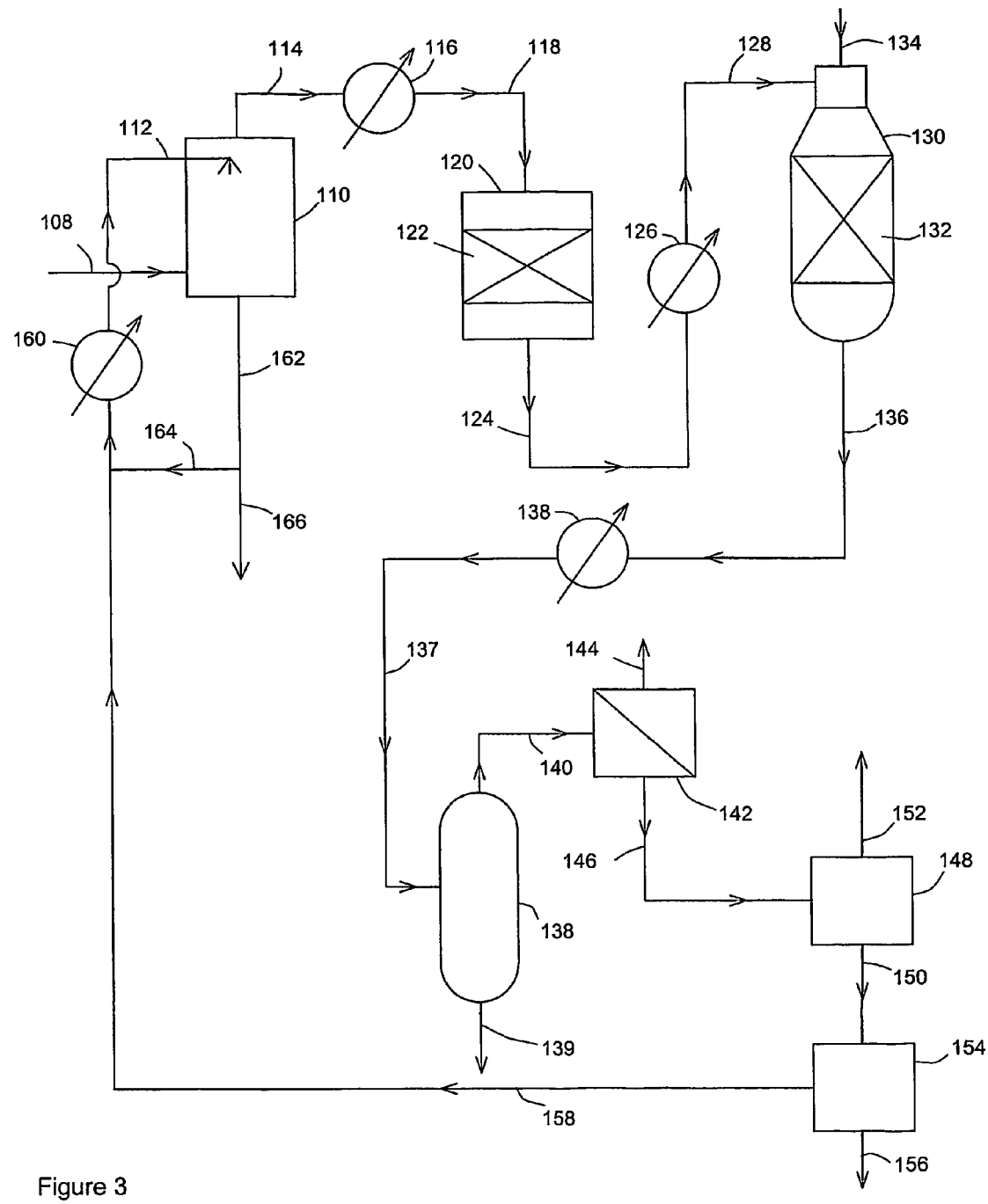
FIG. 3 is a diagrammatic flowsheet of an embodiment of the invention utilising a pre-reformer in combination with an autothermal reformer, wherein saturator wastewater is recycled to the saturator feed stream.

In FIG. 3, a preheated desulphurised hydrocarbon feedstock is fed via line 108 to a saturator 110 where it is combined with steam generated by co-produced water fed via line 112. The resulting hydrocarbon feedstock/steam mixture is fed via line 114 to a heat exchanger 116 where it is heated before being fed via line 118 to a pre-reformer 120 containing a bed of a nickel steam reforming catalyst 122. The hydrocarbon feedstock/steam mixture is partially steam reformed adiabatically as it passed through the bed of nickel catalyst. The resulting partially reformed gas mixture is fed via line 124 to a heat exchanger 126 where it is heated before being fed via line 128 to the burner (not shown) of an autothermal reformer 130. The burner is disposed over a bed of nickel steam reforming catalyst 132. The partially reformed gas mixture is partially combusted under the burner with air fed via line 134. The partially combusted gas stream then passes through the bed of steam reforming catalyst 132 that brings the composition of the resulting reformed gas mixture towards equilibrium. The reformed gas mixture leaves the autothermal reformer 130 via line 136 and passes through a series of heat exchangers 138 that cool the reformed gas mixture to below the dew point of steam. The cooled reformed gas mixture is fed via line 137 to a separator 138, which separates the process condensate from the de-watered synthesis gas. The process condensate is recovered via line 139 and may be used to generate steam. The de-watered synthesis gas is fed via line 140 to a hydrogen separation unit 142 in which a portion of the hydrogen present in the de-watered synthesis gas is removed via line 144. The resulting hydrogen-depleted de-watered synthesis gas is then fed via line 146 to a Fischer Tropsch synthesis stage 148, wherein liquid hydrocarbons are synthesised and are separated, together with co-produced water, as a product stream 150 leaving a tail gas stream 152. The tail gas stream may, if desired, be added to the hydrocarbon/steam mixture, e.g. in line 118, or may be added to the partially reformed gas, e.g. in line 128. The product stream 150 is fed to a separator 154 where co-produced water is separated from the synthesised liquid hydrocarbons 156. The co-produced water is fed from the separator 154 via line 158 to a heat exchanger 160 where it is heated before being fed to saturator 110 via line 112. A portion of the wastewater 162 from the saturator 110 is recycled to the co-produced water stream 158 via line 164. The portion of saturator wastewater that is not recycled is discharged via line 166.

EXAMPLES

The invention is further illustrated by reference to the following calculated examples illustrating the temperature, pressure and composition of the various streams in kmol/hr.

Example 1

Table 1 contains data calculated for a 80000 barrel-per-day Fischer-Tropsch process operated in accordance with the flowsheet depicted in FIG. 1 at a steam ratio of approximately 0.6.

Example 2

Table 2 contains data calculated for a 20000 barrel-per-day Fischer-Tropsch process operated in accordance with the flowsheet depicted in FIG. 3.

The data shows that a large percentage of the oxygenates may be recycled in both cases via the co-produced water streams fed to the reforming processes.

TABLE 1

| | | Stream | | | | | | | | |
|---|---|---|---|---|---|---|---|---|---|---|
| | | 10 | 20 | 18 | 15 | 24 | 30 | 32 | 44 | 48 |
| Temp | deg C. | 64 | 190 | 113 | 300 | 420 | 741 | 350 | 30 | 550 |
| Press | kPa | 3550 | 3550 | 3550 | 4000 | 3500 | 3150 | 3250 | 3500 | 2950 |
| Flow | kmols/hr | 33133 | 53314 | 11987 | 1557 | 54872 | 69487 | 13502 | 16654 | 137272 |
| Methane | | 29133 | 29133 | 0 | 0 | 29133 | 25490 | 1938 | 0 | 1654 |
| Ethane | | 1657 | 1657 | 0 | 0 | 1657 | 0 | 73 | 0 | 0 |
| Propane | | 33 | 33 | 0 | 0 | 33 | 0 | 47 | 0 | 0 |
| Butane | | 0 | 0 | 0 | 0 | 0 | 0 | 64 | 0 | 0 |
| CO | | 0 | 1 | 0 | 0 | 1 | 4462 | 1949 | 0 | 34550 |
| $CO_2$ | | 0 | 5 | 0 | 0 | 5 | 2851 | 3732 | 0 | 5627 |
| $H_2$ | | 653 | 653 | 0 | 0 | 653 | 23446 | 1897 | 0 | 71632 |
| $H_2O$ | | 0 | 19994 | 11983 | 1557 | 21551 | 11579 | 8 | 0 | 18516 |
| $O_2$ | | 0 | 0 | 0 | 0 | 0 | 0 | 0 | 16571 | 0 |
| $N_2$ | | 1657 | 1657 | 0 | 0 | 1657 | 1657 | 3468 | 42 | 5167 |
| Ar | | 0 | 0 | 0 | 0 | 0 | 0 | 85 | 42 | 126 |
| Propene | | 0 | 0 | 0 | 0 | 0 | 0 | 164 | 0 | 0 |
| Pentane | | 0 | 0 | 0 | 0 | 0 | 0 | 41 | 0 | 0 |
| Hexane | | 0 | 0 | 0 | 0 | 0 | 0 | 18 | 0 | 0 |
| Heptane | | 0 | 0 | 0 | 0 | 0 | 0 | 4 | 0 | 0 |
| Octane | | 0 | 0 | 0 | 0 | 0 | 0 | 1 | 0 | 0 |
| Nonane | | 0 | 0 | 0 | 0 | 0 | 0 | 0 | 0 | 0 |
| Decane | | 0 | 0 | 0 | 0 | 0 | 0 | 0 | 0 | 0 |
| C13-C30 | | 0 | 0 | 0 | 0 | 0 | 0 | 0 | 0 | 0 |
| Methanol | | 0 | 123 | 4 | 0 | 123 | 0 | 3 | 0 | 0 |
| Ethanol | | 0 | 47 | 0 | 0 | 47 | 0 | 8 | 0 | 0 |
| Propanol | | 0 | 12 | 0 | 0 | 12 | 0 | 1 | 0 | 0 |

| | | Stream | | | | | | | |
|---|---|---|---|---|---|---|---|---|---|
| | | 56 | 58 | 62 | 64 | 70 | 72 | 102 | 104 |
| Temp | deg C. | 55 | 55 | 71 | 70 | 5 | 5 | 25 | 55 |
| Press | kPa | 2700 | 2700 | 1200 | 2600 | 1730 | 1730 | 100 | 2500 |
| Flow | kmols/hr | 17739 | 119533 | 2876 | 116657 | 20084 | 6577 | 1496 | 32165 |
| Methane | | 0 | 1654 | 0 | 1654 | 2887 | 945 | 1 | 0 |
| Ethane | | 0 | 0 | 0 | 0 | 109 | 36 | 0 | 0 |
| Propane | | 0 | 0 | 0 | 0 | 70 | 23 | 2 | 0 |
| Butane | | 0 | 0 | 0 | 0 | 96 | 31 | 11 | 0 |
| CO | | 0 | 34550 | 0 | 34550 | 2901 | 950 | 0 | 0 |
| $CO_2$ | | 5 | 5622 | 56 | 5565 | 5550 | 1818 | 11 | 0 |
| $H_2$ | | 0 | 71631 | 2742 | 68890 | 2819 | 923 | 0 | 0 |
| $H_2O$ | | 17733 | 783 | 78 | 705 | 12 | 4 | 0 | 31977 |
| $O_2$ | | 0 | 0 | 0 | 0 | 0 | 0 | 0 | 0 |
| $N_2$ | | 0 | 5167 | 0 | 5167 | 5157 | 1689 | 0 | 0 |
| Ar | | 0 | 126 | 0 | 126 | 126 | 41 | 0 | 0 |
| Propene | | 0 | 0 | 0 | 0 | 244 | 80 | 4 | 0 |
| Pentane | | 0 | 0 | 0 | 0 | 62 | 20 | 31 | 0 |

TABLE 1-continued

| | | | | | | | | |
|---|---|---|---|---|---|---|---|---|
| Hexane | 0 | 0 | 0 | 0 | 27 | 9 | 57 | 0 |
| Heptane | 0 | 0 | 0 | 0 | 6 | 2 | 66 | 0 |
| Octane | 0 | 0 | 0 | 0 | 1 | 0 | 69 | 0 |
| Nonane | 0 | 0 | 0 | 0 | 0 | 0 | 64 | 0 |
| Decane | 0 | 0 | 0 | 0 | 0 | 0 | 58 | 0 |
| C13-C30 | 0 | 0 | 0 | 0 | 0 | 0 | 1119 | 0 |
| Methanol | 0 | 0 | 0 | 0 | 5 | 2 | 0 | 127 |
| Ethanol | 0 | 0 | 0 | 0 | 12 | 4 | 0 | 47 |
| Propanol | 0 | 0 | 0 | 0 | 1 | 0 | 0 | 12 |

TABLE 2

| | | Stream | | | | | | | | |
|---|---|---|---|---|---|---|---|---|---|---|
| | | 108 | 114 | 118 | 124 | 128 | 134 | 136 | 137 | 139 |
| Temperature | °C. | 123 | 197 | 500 | 465 | 620 | 620 | 1050 | 60 | 51 |
| Pressure | kPa | 3935 | 3850 | 3750 | 3665 | 3465 | 3695 | 3345 | 3275 | 3275 |
| Molar Flow | kgmole/h | 10631 | 17107 | 17107 | 17863 | 17863 | 30768 | 62541 | 62541 | 7115 |
| Methane | | 9782 | 9779 | 9779 | 10281 | 10281 | 0 | 133 | 133 | 0 |
| Ethane | | 343 | 343 | 343 | 0 | 0 | 0 | 0 | 0 | 0 |
| Propane | | 31 | 30 | 30 | 0 | 0 | 0 | 0 | 0 | 0 |
| Carbon Dioxide | | 71 | 71 | 71 | 443 | 443 | 10 | 1693 | 1693 | 2 |
| Nitrogen | | 182 | 182 | 182 | 182 | 182 | 23808 | 23990 | 23990 | 1 |
| Hydrogen | | 212 | 212 | 212 | 1211 | 1211 | 0 | 20123 | 20123 | 0 |
| Carbon Monoxide | | 8 | 8 | 8 | 14 | 14 | 0 | 8923 | 8923 | 0 |
| Water | | 1 | 6434 | 6434 | 5732 | 5732 | 279 | 7395 | 7395 | 7112 |
| Methanol | | 0 | 15 | 15 | 0 | 0 | 0 | 0 | 0 | 0 |
| Ethanol | | 0 | 18 | 18 | 0 | 0 | 0 | 0 | 0 | 0 |
| Propanol | | 0 | 8 | 8 | 0 | 0 | 0 | 0 | 0 | 0 |
| Butanol | | 0 | 3 | 3 | 0 | 0 | 0 | 0 | 0 | 0 |
| Pentanol | | 0 | 2 | 2 | 0 | 0 | 0 | 0 | 0 | 0 |
| Oxygen | | 0 | 0 | 0 | 0 | 0 | 6386 | 0 | 0 | 0 |
| Argon | | 0 | 0 | 0 | 0 | 0 | 285 | 285 | 285 | 0 |

| | | Stream | | | | | | | |
|---|---|---|---|---|---|---|---|---|---|
| | | 140 | 146 | 144 | 158 | 112 | 162 | 166 | 164 |
| Temperature | °C. | 51 | 70 | 70 | 40 | 242 | 197 | 197 | 197 |
| Pressure | kPa | 3275 | 3200 | 1400 | 4050 | 3930 | 3850 | 3850 | 3850 |
| Molar Flow | kgmole/h | 55426 | 54213 | 1213 | 9500 | 69797 | 63322 | 3166 | 60156 |
| Methane | | 133 | 133 | 0 | 0 | 67 | 71 | 4 | 67 |
| Ethane | | 0 | 0 | 0 | 0 | 3 | 3 | 0 | 3 |
| Propane | | 0 | 0 | 0 | 0 | 8 | 9 | 0 | 8 |
| Carbon Dioxide | | 1691 | 1639 | 52 | 0 | 5 | 5 | 0 | 5 |
| Nitrogen | | 23989 | 23900 | 89 | 0 | 0 | 0 | 0 | 0 |
| Hydrogen | | 20123 | 18910 | 1213 | 0 | 0 | 0 | 0 | 0 |
| Carbon Monoxide | | 8923 | 8875 | 48 | 0 | 0 | 0 | 0 | 0 |
| Water | | 283 | 275 | 7 | 9450 | 69468 | 63177 | 3159 | 60018 |
| Methanol | | 0 | 0 | 0 | 16 | 41 | 26 | 1 | 25 |
| Ethanol | | 0 | 0 | 0 | 19 | 39 | 20 | 1 | 19 |
| Propanol | | 0 | 0 | 0 | 9 | 14 | 5 | 0 | 5 |
| Butanol | | 0 | 0 | 0 | 3 | 5 | 1 | 0 | 1 |
| Pentanol | | 0 | 0 | 0 | 2 | 3 | 1 | 0 | 1 |
| Oxygen | | 0 | 0 | 0 | 0 | 0 | 0 | 0 | 0 |
| Argon | | 285 | 285 | 0 | 0 | 0 | 0 | 0 | 0 |

The invention claimed is:

1. A process for the production of hydrocarbons comprising;
   a) subjecting a mixture of a hydrocarbon feedstock and steam to catalytic steam reforming to form a partially reformed gas,
   b) subjecting the partially reformed gas to partial combustion with an oxygen-containing gas and bringing the resultant partially combusted gas towards equilibrium over a steam reforming catalyst to form a reformed gas mixture,
   c) cooling the reformed gas mixture to below the dew point of the steam therein to condense water and separating the condensed water to give a de-watered synthesis gas,
   d) synthesising hydrocarbons from said de-watered synthesis gas by the Fischer-Tropsch reaction and
   e) separating the hydrocarbons from co-produced water, wherein >50% by weight of the co-produced water from the Fischer-Tropsch reaction is fed to a saturator wherein the co-produced water is contacted with the hydrocarbon feedstock to provide at least part of the mixture of hydrocarbon feedstock and steam subjected to steam reforming.

2. A process according to claim 1 wherein the reformed gas mixture is generated by;
 a) subjecting a mixture of the hydrocarbon feedstock and steam to steam reforming by passing the mixture over a catalyst disposed in externally-heated tubes in a heat exchange reformer to form a primary reformed gas,
 b) subjecting the primary reformed gas to secondary reforming by partially combusting the primary reformed gas with an oxygen-containing gas and bringing the resultant partially combusted gas towards equilibrium over a secondary reforming catalyst to form the reformed gas mixture.

3. A process according to claim 2 wherein the reformed gas mixture is used to heat the tubes of the heat exchange reformer, thereby producing a partially cooled reformed gas mixture.

4. A process according to claim 1 wherein the reformed gas mixture is generated by
 a) subjecting a hydrocarbon feedstock/steam mixture to at least one stage of adiabatic steam reforming to provide a pre-formed gas, and
 b) passing the pre-reformed gas to an autothermal reformer where it is partially combusted with an oxygen-containing gas and the partially combusted gas is passed through a bed of steam reforming catalyst to form the reformed gas mixture.

5. A process according to claim 2 wherein the hydrocarbon feedstock is divided into two streams: a first stream is mixed with steam and a second stream is combined with the partially reformed gas wherein the second hydrocarbon stream comprises between 5 and 50% by volume of the hydrocarbon feedstock.

6. A process according to claim 1 wherein carbon dioxide is separated from the de-watered synthesis gas prior to synthesis of the hydrocarbons and is added to the partially reformed gas before the partial combustion thereof.

7. A process according to claim 1 wherein a tail gas from the synthesis of hydrocarbons is added to the partially reformed gas before partial combustion thereof.

8. A process according to claim 1 wherein the de-watered synthesis gas is subjected to a step of hydrogen separation before it is passed to the Fischer-Tropsch hydrocarbon synthesis stage.

9. A process according to claim 1 wherein the process is operated at an overall steam ratio below 1.5.

10. A process according to claim 1 wherein >75% by weight of the co-produced water from the Fischer-Tropsch reaction is fed to the saturator.

* * * * *